US006176124B1

(12) United States Patent
Tachikiri

(10) Patent No.: US 6,176,124 B1
(45) **Date of Patent: *Jan. 23, 2001**

(54) SPARK PLUG CONNECTOR CHECKING APPARATUS

(75) Inventor: Hiroto Tachikiri, Yokkaichi (JP)

(73) Assignee: Sumitomo Wiring Systems, Ltd., Yokkaichi (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/886,406

(22) Filed: Jul. 1, 1997

(30) Foreign Application Priority Data

Jul. 3, 1996 (JP) .................................................. 8-173595

(51) Int. Cl.[7] .................................................... G01M 15/00
(52) U.S. Cl. .......................................... 73/118.1; 73/865.9
(58) Field of Search .................................... 73/865.8, 116, 73/117.2, 117.3, 118.1; 324/397, 399, 402

(56) References Cited

U.S. PATENT DOCUMENTS 3,617,870 * 11/1971 Howes .................................. 324/15
4,160,203 * 7/1979 Volk ...................................... 324/15
5,426,369 * 6/1995 Brinker ................................. 73/116

FOREIGN PATENT DOCUMENTS 0716482 6/1996 (EP) .

* cited by examiner

*Primary Examiner*—G. Dombroske
(74) *Attorney, Agent, or Firm*—Greenblum & Bernstein P.L.C.

(57) ABSTRACT

A bushing holder unit includes a cap holder unit including a cap holder in which a cap portion of a spark plug connector is fit, and a magnetizable portion by which the cap holder unit may be magnetically fixed. A magnetic fixing mechanism magnetically fixes and releases the magnetizable portion of the cap holder unit, and includes a shift guide that provides free axial movement of a bushing stem of a spark plug connector. An axial guide prevents lateral movement of a bushing of a spark plug connector but provides free axial movement of the bushing along the axial direction. A bushing holder receives the bushing, and includes a threshold plate with a measuring threshold surface that receives a connecting rim of the bushing. A thrust mechanism moves the cap holder unit along the axial direction, so that the connecting rim of the bushing contacts the measuring threshold surface.

7 Claims, 6 Drawing Sheets

SPARK PLUG CONNECTOR CHECKING APPARATUS

BACKGROUND OF THE INVENTION

1. Field of the Invention

The present invention relates to an apparatus for inspecting a spark plug connector, and more particularly, to an apparatus for checking a spark plug connector used in internal combustion engines for vehicles such as automobiles.

2. Description of the Prior Art

The spark plug connector electrically connects the terminal of a spark plug (installed in a plug hole) to a high-tension electrical cable extending from a distributor. As shown in FIG. 1, a spark plug connector 6 includes a pipe 3 of circular cross-section, containing a connector terminal 2. The pipe 3 may be formed from resin plastic. One end of the connector terminal 2 is electrically connected to a high-tension electrical cable 1, while the other end is electrically connected to the terminal of a spark plug fitted at the base of a plug hole (not shown). A bushing 4, made of an insulating elastic material such as silicone rubber, is fitted at one end portion of the pipe 3. The bushing 4 covers the external and internal surface of the end portion of the spark plug connector 6. A waterproof cover 5, made of an insulating elastic material such as silicone rubber, is fitted at the other end portion of the pipe 3, closing off the pipe entrance. In this structure, the term "bushing stem" designates the assembly of the pipe 3, the bushing 4 and the waterproof cover 5.

In order to avoid a loose contact between the spark plug and the bushing stem 7 after the bushing stem 7 is assembled, a distance S between the bushing-side rim of the bushing stem 7 and the tip of the connector terminal 2 is measured. The distance S is then assessed as to whether it is within a tolerated range.

As shown in FIGS. 2 and 3, a conventional detection device 8 is used to detect a departure from the tolerances. The detection device 8 includes a bushing holder unit 9 that laterally holds the bushing stem 7 (i.e., in the left and right directions in FIGS. 2 and 3) and a deviation detecting unit 10. The deviation detecting unit 10 is provided to one side of the bushing holder 9 (the right side in FIGS. 2 and 3). The deviation detecting unit 10 is introduced from the side of the bushing 4 of the bushing stem 7 so that the distance S from the bushing 4 to the connector terminal 2 may be measured.

The bushing holder unit 9 includes a fixing plate 11 having a flat rectangular form, and a bushing holder 12 provided at the plug end portion of the fixing plate 11. The bushing holder 12 is formed with a holding recess 12*a* that holds the bushing 4 in a snug fit and a threshold plate 13. The threshold plate 13 is formed with a (measuring) contact surface 13*a* for determining the contact position of the end face (rim) of the bushing 4. A waterproof cover holder 14 is fixed on the leftward portion of the bushing holder unit 9, and is formed with a fitting recess 14*a* that grips the waterproof cover 5. The fixing plate 11 is fixedly provided on a frame portion 15 of the detection device 8.

The deviation detecting unit 10 further includes a mobile base plate 16 fixed to the frame portion 15 of the detection device 8, but freely reciprocable in the axial direction (i.e., the left and right directions of FIGS. 2 and 3). A drive cylinder 17, connected to the frame portion 15, produces an axial thrust that displaces the mobile base plate 16. A measuring probe 19 is mounted on the mobile base plate 16, through a supporting block 18. The measuring probe 19 therefore moves in accordance with the movement of the mobile base plate 16. A distance measuring device 20, including at least an optical sensor or the like, detects the shifted position of the measuring probe 19. The mobile base plate 16 and the drive cylinder 17 are arranged on the frame portion 15 of the detection device 8 such that a tip portion 19*a* of the measuring probe 19 is in front of and aligns with the corresponding bushing stem 7.

As shown in FIG. 2, the tip portion 19*a* of the measuring probe 19 is normally set up in a ready-to-trigger position by an elastic or biasing device (not shown), and the tip portion 19*a* may be thrust towards the bushing holder unit 9 by a predetermined length.

When detecting the deviation in the plug connector 6, the waterproof cover 5 of the bushing stem 7 is retained within the fitting recess 14*a* of the waterproof cover holder 14, while the bushing 4 is securely pressed into the holding recess 12*a* of the bushing holder 12.

In this state, the drive cylinder 17 of the deviation detecting unit 10 is actuated toward full extension. The mobile base plate 16 is then shifted towards the bushing holder unit 9. The tip 19*a* of the measuring probe 19 is passed through an orifice (not shown) formed in the threshold plate 13, and is inserted from the side of the bushing 4 into the bushing stem 7. As shown by the cross-sectional view in FIG. 1, the tip 19*a* abuts the rim of the connector terminal 2.

If the mobile base plate 16 is further extended from this position, the measuring probe 19 is pushed back toward the distance measuring device 20, against the force of the elastic or biasing device (not shown). The measuring plate 19*b* provided at the distance measuring device 20 end of the measuring probe 19 approaches the distance measuring device 20.

Subsequently, the distance A between the measuring plate 19*b* (after being pushed back) and the distance measuring device 20 is measured by the distance measuring device 20, so that the distance S between the rim of the bushing 4 and the tip of the connector terminal 2, and/or deviation from a predetermined distance S, may be indirectly determined. Consequently, it can be determined whether the distance S is within appointed tolerances.

However, in a conventional detection device 8 for plug connector, the bushing holder unit 9 has a bushing holder 12 and a waterproof cover holder 14 specifically modelled on the particular forms of a bushing 4 of the bushing stem 7 and waterproof cover 5 to be inspected. That is, the particular waterproof cover 5 of the bushing stem 7 is retained within a matching fitting recess 14*a* on the waterproof cover holder 14, while a particular bushing 4 is pressed into a matching holding recess 12*a* on the bushing holder 12. Thereafter, the deviation of the distance between the rim of the plug connector 6 (specifically, the outside rim of the bushing 4) and the tip of the connector terminal 2 is measured. Moreover, the bushing 4 and the waterproof cover 5 must be pushed to fit onto a pipe 3 of the bushing stem 7. In such a case, depending upon the pushing force, the total length of the bushing stem 7 may vary, causing a distance deviation B between the (measuring) contact surface 13*a* of the threshold plate 13 and the rim of the bushing 4.

In other words, when measuring the distance S, the rim of the bushing 4 cannot always be placed at a predetermined position, and the distance deviation B often occurs. This distance deviation B leads to measuring error, so that some errors may occur when categorizing conforming and non-conforming products.

Furthermore, in the known devices, a specific type of bushing holder is applied to each different type of plug connector, while each type of plug connector uses a number of types of waterproof cover. Consequently, the conformity of products may be determined by the degree of fit only after the waterproof cover is fitted into the fitting recess. Moreover, each type of bushing holder unit is applicable to one specific type of plug connector and is fixed on the frame portion of the deviation detecting device. In this construction, the bushing holder unit is not amenable for adaptation to various configurations, and therefore cannot be used to measure various plug connectors.

SUMMARY OF THE INVENTION

It is therefore an object of the present invention to provide a spark plug connector deviation detecting apparatus having improved measuring precision, and where portions of the apparatus may be easily exchanged to fit various plug connectors, widening the applicability of the apparatus.

According to the embodiments of the invention, the device is applicable to spark plug connectors having a bushing stem adapted to fit to a spark plug. The bushing stem has an axial direction and includes a terminal with a tip edge adapted to connect to a spark plug having a plug rim, a bushing with a connecting rim adapted to receive the plug rim, a connecting path connecting the bushing stem to a high-tension electrical cable, and a cap portion for fixing the connecting path.

In order to achieve this object, according to one aspect of the present invention, a spark plug connector checking apparatus includes a bushing holder unit. The bushing holder unit includes a cap holder unit, with a cap holder in which the cap portion is fit. The cap holder unit may be magnetically fixed by a magnetizable portion using a magnetic fixing mechanism that magnetically fixes and releases the bushing stem via the magnetizable portion of the cap holder unit. The magnetic fixing mechanism incorporates a shift guide that provides free axial movement of the bushing stem along the axial direction when the bushing stem is magnetically fixed. The bushing holder unit further includes an axial guide that prevents lateral movement of the bushing but provides free axial movement of the bushing along the axial direction. A bushing holder of the bushing holder unit receives the bushing of the spark plug connector, and includes a threshold plate with a measuring threshold surface that receives the connecting rim of the bushing moved along the axial direction. A thrust mechanism that moves the cap holder unit and the bushing stem along the axial direction, so that the connecting rim of the bushing contacts the measuring threshold surface.

In this manner, as the connecting rim of the bushing contacts the measuring threshold surface, the distance between the measuring threshold surface (in contact with the connecting rim of the bushing) and the tip of the connector terminal is measured, and any gap between the measuring threshold surface and the connecting rim of the bushing is reduced or eliminated, removing the effect of the gap from the measurement.

Preferably, the spark plug connector checking apparatus further includes a deviation detecting unit that detects a deviation of the distance between the connecting rim of the bushing and the tip rim of the connection terminal. The deviation detecting unit includes a tip portion for insertion into the bushing from the connecting rim side, and a detector for detecting a deviation in a predetermined gap between the measuring threshold face and the tip rim of the connection terminal.

In one modification of the apparatus, the tip portion of the deviation detecting unit includes a plurality of indicator powder projecting orifices, and an indicator powder supply unit connected to the indicator powder projecting orifices. In this manner, indicating powder may be projected into the bushing stem to indicate whether or not a particular pug connector being checked meets specifications.

In the preferred apparatus, the magnetizable portion includes a metal plate extending over the length of the cap holder unit on a side of the cap holder unit opposite the cap holder. In another implementation of the apparatus, the shift guide includes a pair of rails extending in the axial direction and a mobile plate reciprocable along the pair of rails.

Further, the thrust mechanism may include a pressing device that presses the connecting rim of the bushing against the measuring threshold surface at a constant force. In this case, the thrust mechanism preferably includes a piston cylinder mounted to the cap holder unit at an end opposite the bushing, an elastic biasing device in the piston cylinder and a thrusting device that pushes a piston and a connecting rod. The piston enters the piston cylinder via the opening and pushes the elastic biasing device towards the cap holder unit.

With this construction, when the thrust mechanism pushes the bushing of the bushing stem against the measuring threshold plate, the bushing is pushed against the plate with a constant and resilient force.

BRIEF DESCRIPTION OF THE DRAWINGS

The above object, features and advantages of the invention will be made apparent from the following description of the preferred embodiments, given as a non-limiting example, with reference to the accompanying drawings, in which.

DETAILED DESCRIPTION OF THE PREFERRED EMBODIMENTS

Figure 1:
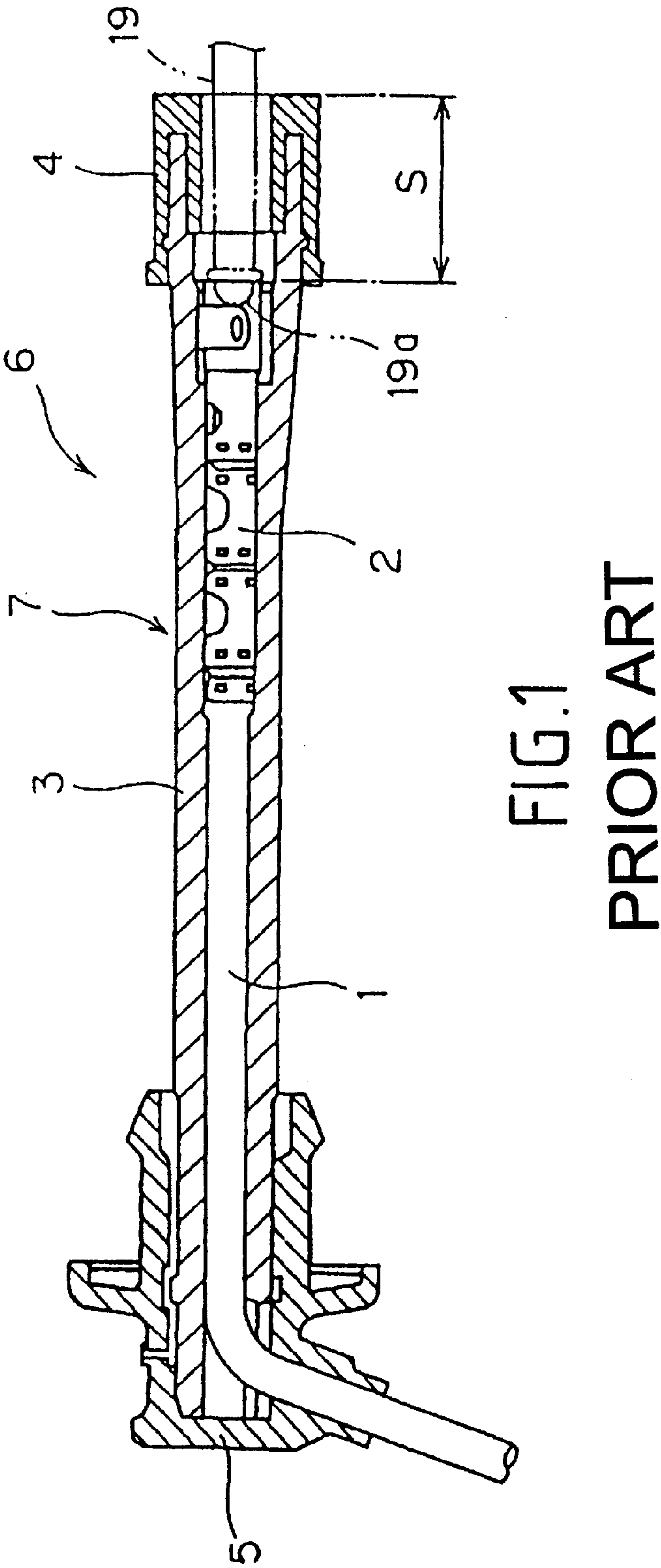
FIG.1 PRIOR ART
FIG. 1 shows a cross-sectional view of a known plug connector.
Figure 2:
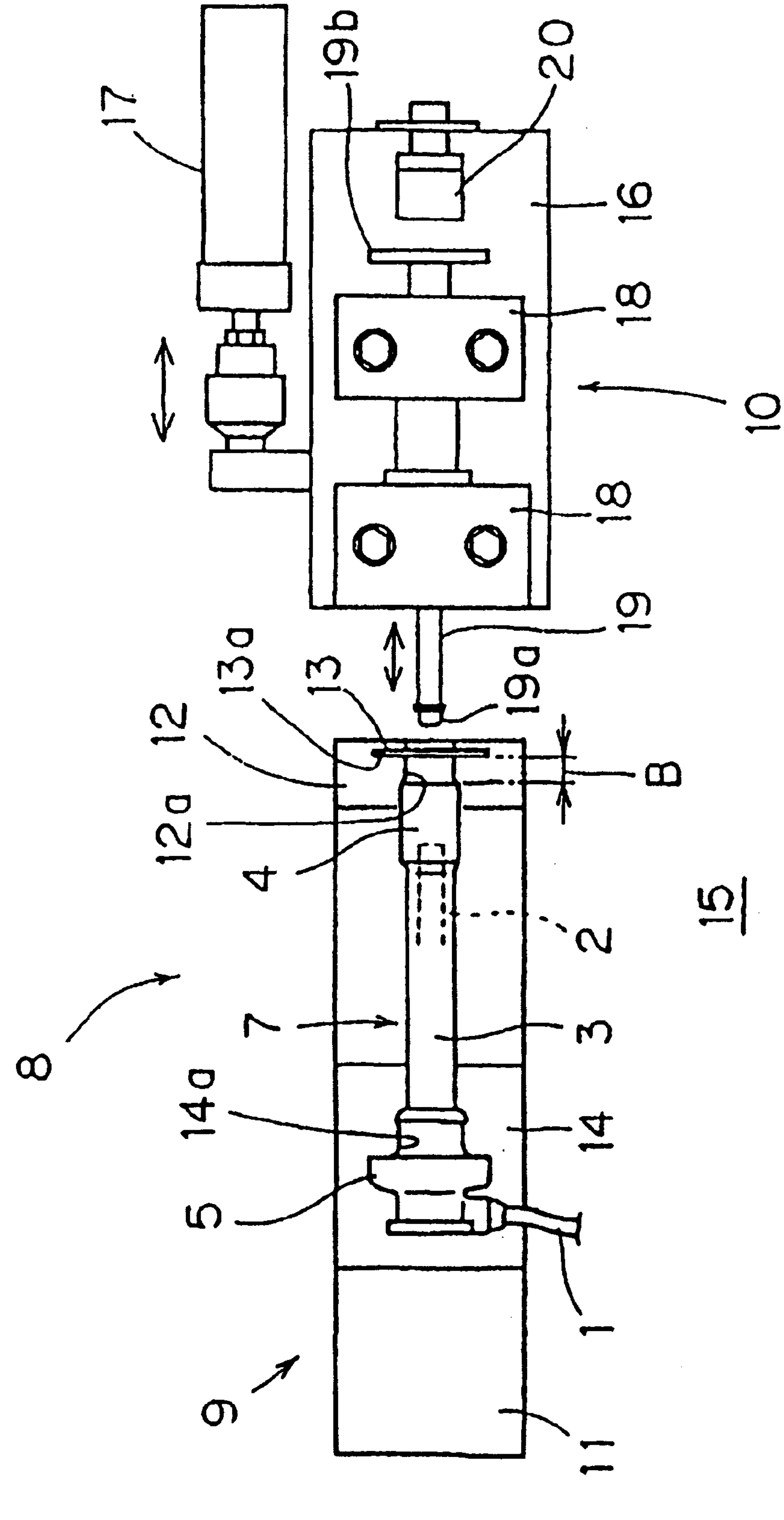
FIG.2 PRIOR ART
FIGS. 2 and 3 show a plan view of a known apparatus including a bushing holder unit, a gap detecting unit, and their respective drive mechanisms.
Figure 3:
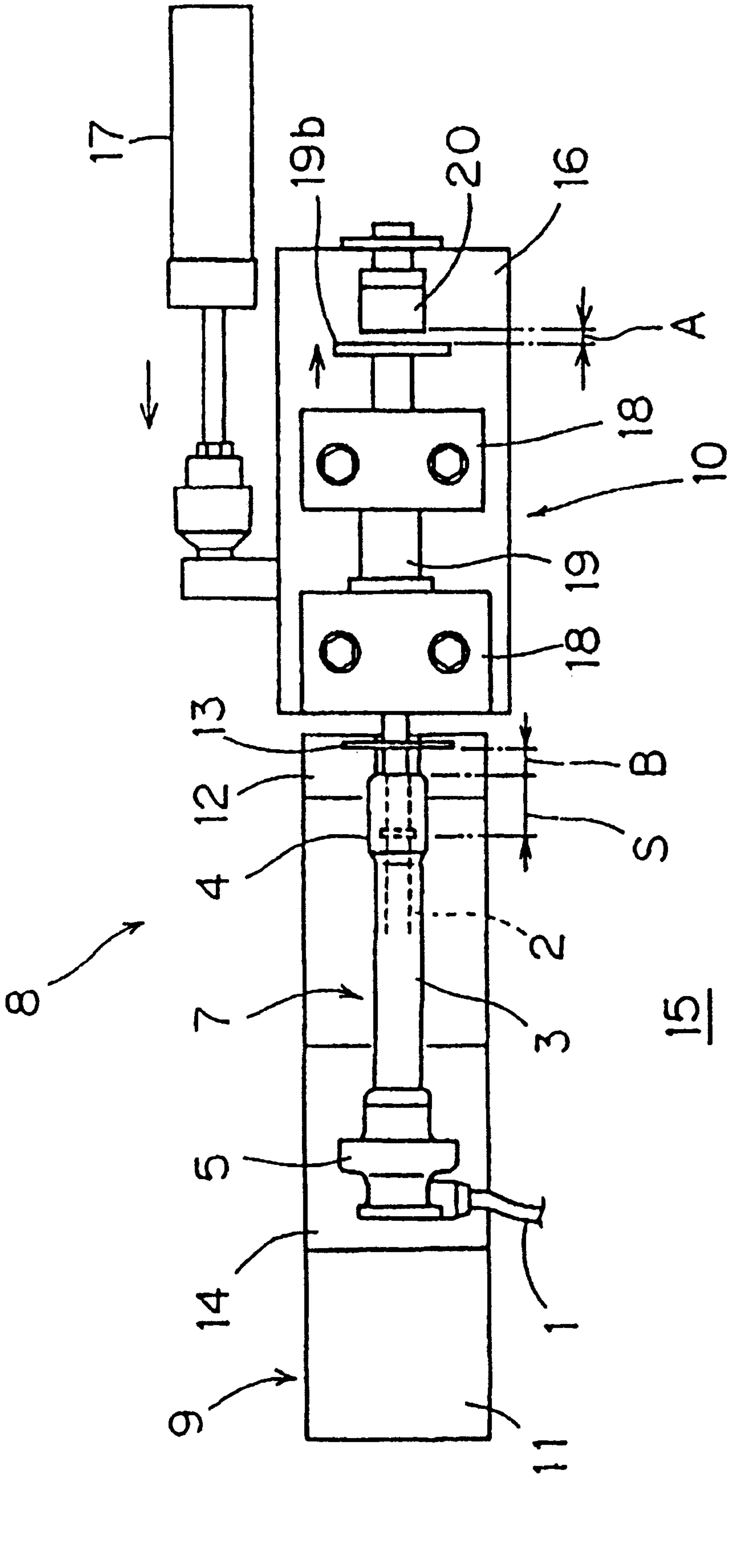
FIG.3 PRIOR ART
Figure 4:
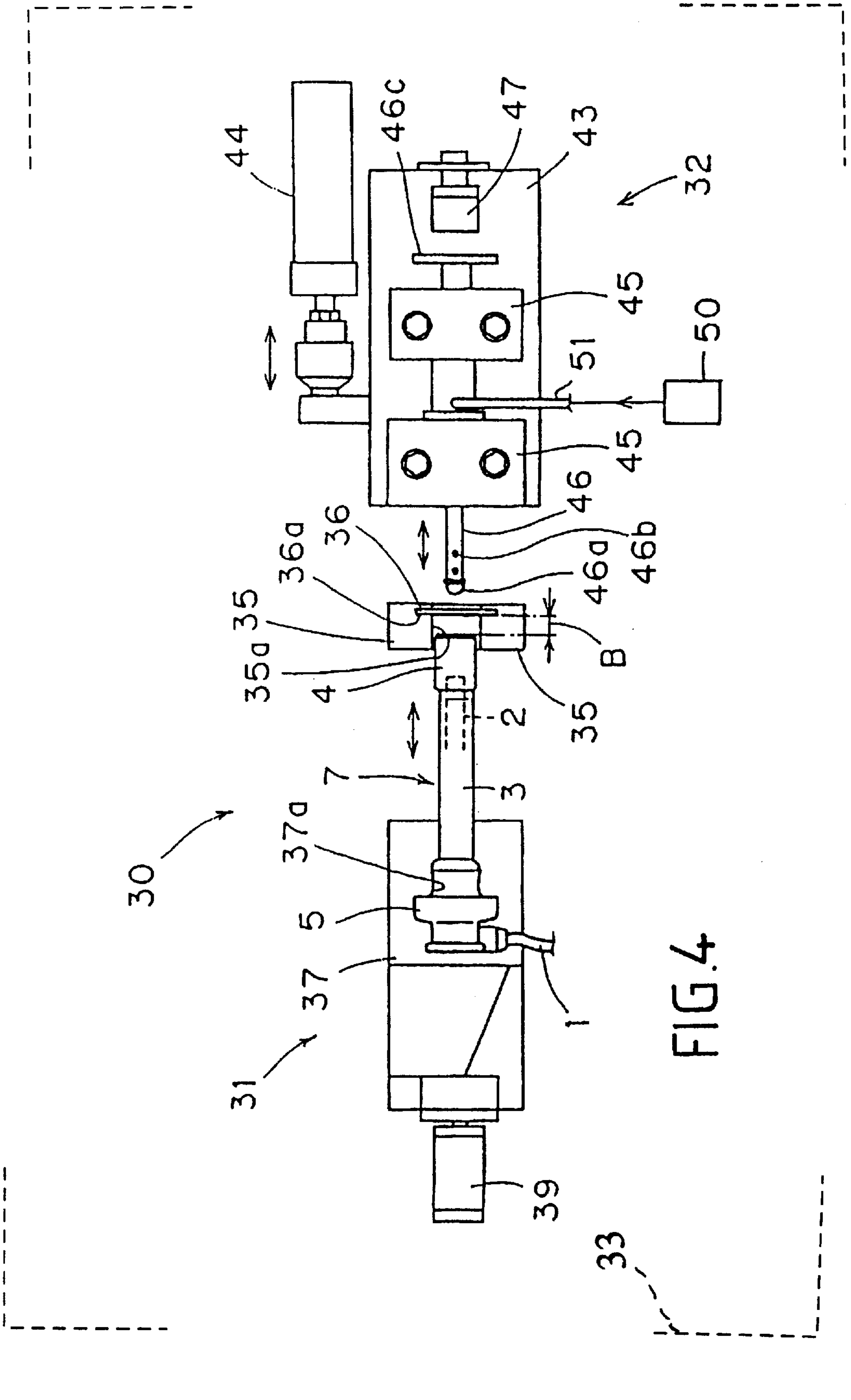
FIGS. 4 and 5 show a plan view of an embodiment of the invention including a bushing holder unit, a gap detecting unit, and their respective drive mechanisms.
Figure 5:
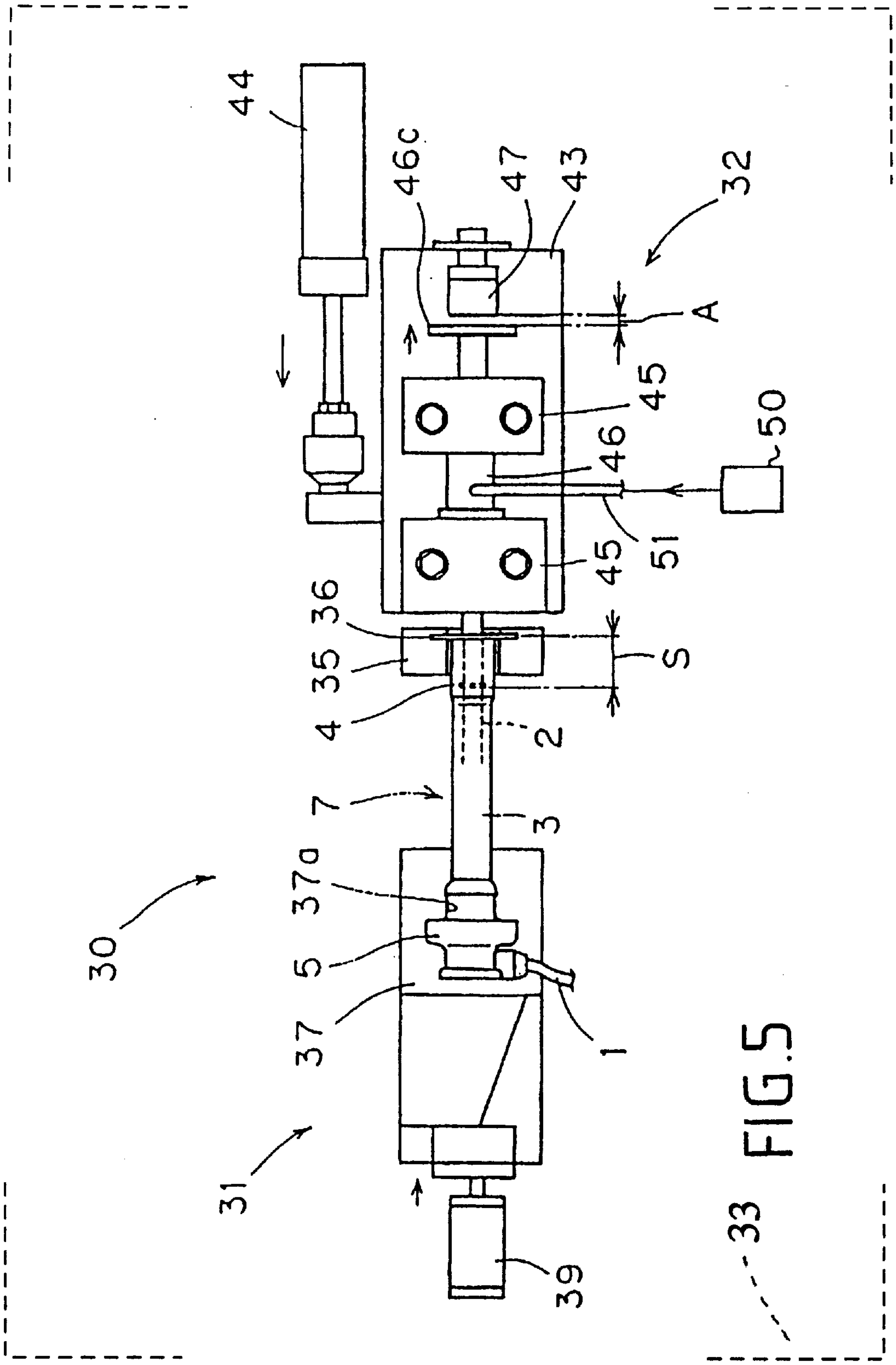
Figure 6:
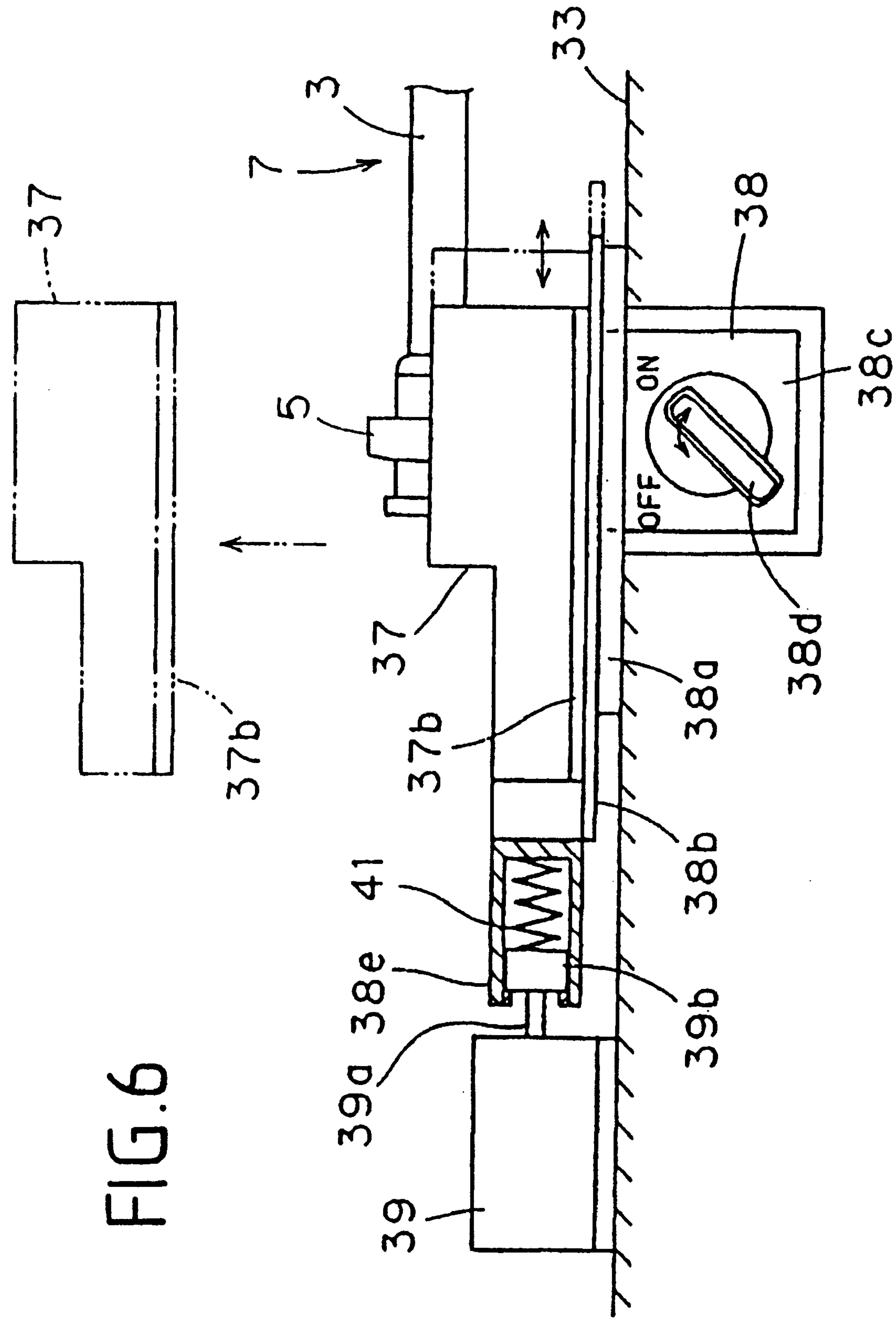
FIG. 6 shows a side view of a cap holding unit, a magnetic fixing mechanism, and a thrust mechanism of the embodiment of FIG. 5.

Referring to FIGS. 4–6, the detection apparatus 30 for checking a spark plug connector includes a bushing holder unit 31 and a gap (deviation) detecting unit 32, all supported by a frame portion 33. The bushing holder unit 31 includes a holding recess 35*a* formed in a bushing holder 35, which holds a bushing 4 of a bushing stem 7 located at an end of a plug connector connectable to a spark plug, such that the bushing 4 and bushing stem 7 can be freely moved along the axial direction of the bushing stem 7. The bushing holder 35 contains a threshold abutment plate 36. The threshold abutment plate 36 includes a (measuring) threshold surface 36*a* against which the position of the bushing 4 is measured.

The bushing holder unit 31 also includes a cap holding device, e.g., a waterproof cover holding device 37. A fitting recess 37*a* formed in the waterproof cover holding device 37 grips a waterproof cover 5, i.e., a cap portion, on the bushing stem 7 of the plug connector. The waterproof cover holding device 37 includes a magnetically fixable (i.e., magnetizable) portion, e.g., a metal plate 37*b*, extending all along the bottom end face (as shown in FIG. 6) of the waterproof cover holding device 37, such that the waterproof cover holding device 37 can be fixed or released by magnetic force. A magnetic fixing mechanism 38, provided with a shift guide 38*a* and reciprocating shift plate 38*b*, holds the bushing stem 7 via the waterproof cover holding device 37 magnetically fixed to the reciprocating shift plate 38*b*. A trust mechanism pushes the waterproof cover holding device 37 (fixed by the magnetic fixing mechanism 38) along the axial direction, and abuts the rim of the bushing 4 against the threshold surface 36*a* for effecting a measurement. The thrust mechanism preferably includes a thrust cylinder 39 incorporating an air cylinder (described in detail below).

The shift guide 38*a* is fixed on the frame portion 33, and includes a pair of rails arranged at a predetermined separation and linearly extending along the axial direction (as shown in FIG. 6) and the reciprocating shift plate 38*b*. The reciprocating shift plate 38*b* includes a metal plate, laterally held by the rails, but freely reciprocable along the rails in the axial direction.

The magnetic fixing mechanism 38 includes a magnetic core part 38*c* fixed under the reciprocating shift plate 38*b*, and a switch 38*d* arranged on a side face of the magnetic fixing mechanism 38 (shown in FIG. 6 on the viewing side). The magnetic core part 38*c* may include a known eccentrically mounted magnet. When the switch 38*d* is switched on, the metal plate 37*b* becomes magnetically fixed to the reciprocating shift plate 38*b*, e.g., the magnet in the magnetic core part 38*c* may approaches the metal plate 37*b* in the waterproof cover holding device 37. On the other hand, when the switch 38*d* is switched off, the magnet in the magnetic core part 38*c* may retract from the metal plate 37*b*, so that the metal plate 37*b* is magnetically released.

Alternatively, the switch 38*d* may be switched on to trigger a magnetic excitation (e.g., an electromagnetic excitation), so that the metal plate 37*b* is magnetically fixed onto the reciprocating shift plate 38*b*, and the switch 38*d* may be switched off to cut the magnetic excitation and release the metal plate 37*b*.

A guide (piston) cylinder 38*e*, having a base, is fixed to the upper outer side end (the upper left end in FIG. 6) of the reciprocating shift plate. A coil spring 41 is provided inside the guide cylinder 38*e*. The thrust cylinder 39 contains a rod 39*a* and a piston 39*b* fixed to the rod 39*a*. The piston 39*b* is inserted into the guide cylinder 38*e* against the coil spring 41, such that the piston 39*b* can move freely.

When rod 39*a* of the thrust cylinder 39 is extended, the reciprocating shift plate 38*b* is moved toward the bushing holder 35 by the piston 39*b*, coil spring 41, and guide pipe 38*e*. When the rod 39*a* is retracted/contracted, the reciprocating shift plate 38*d* is moved away from the bushing holder 35 to the initial point.

The bushing holder 35 is fixed on the frame portion 33, such that the bushing holder 35 is located toward the gap detecting unit 32 (i.e., rightward in FIGS. 4 and 5 from the waterproof cover holding device 37 fixed by the magnetic fixing mechanism 38), in a position appropriately distanced from the waterproof cover holding device 37. The frame portion 33 contains an aperture of appropriate size (not shown) to allow the magnetic core part 38*c* to be shifted.

The gap detecting unit 32 is fixed in a known manner to the frame portion 33 of the detection apparatus 30. The gap detecting unit 32 includes a mobile base plate 43 held by a similar mechanism to the mobile guide 38*a*, i.e., such that the mobile base plate 43 can freely reciprocate along the axial direction (left and right directions in FIGS. 4–6). A drive cylinder 44 is fixed on the frame portion 33 and reciprocates the mobile base plate 43. A measuring device 46 is held on the mobile base plate 43 via holding blocks 45, so that the measuring device 46 can also freely reciprocate along the axial direction. A distance measuring sensor 47 detects the shifted position of the measuring device 46. The distance measuring sensor 47 contains, for example, an optical sensor.

The mobile base plate 43 and the drive cylinder 44 are arranged on the frame portion 33 of the detection apparatus 30. In this manner, the amount of insertion of the tip portion 46*a* of the measuring probe 46 within the bushing stem 7 corresponds to the position of the bushing stem 7 held by the bushing holder 35 in the bushing holder unit 31.

As shown in FIG. 4, the tip portion 46*a* of the measuring probe 46 is normally held in a ready-to-trigger state by an elastic or biasing device (not shown), so that the tip portion 46*a* can thrust towards the bushing holder unit 31 by a predetermined length.

The measuring probe 46 has an internal tube along its axial direction, from the midpoint to the tip portion 46*a*. The tip portion 46*a* may be provided with a plurality of talc projecting orifices (nozzles) 46*b*. The talc (indicating powder) is stored in a compressed air talc supplying unit 50 located at a midpoint along the axial direction of the holding blocks 45 and is transported to the talc projecting orifices 46*b* via a pipe 51.

In response to instructions from a control unit (not shown), compressed air is intermittently supplied from the compressed air talc supplying unit 50 into the internal tube to give a predetermined quantity of talc. The talc (talcum powder) is ejected from the plurality of talc projecting orifices 46*b* onto the internal circumferential surface of the bushing portion 4 of the bushing stem 7.

When the plug connector 6 is to be tested for possible misalignment, the waterproof cover 5 of the bushing stem 7 is gripped in the fitting recess 37*a* on the waterproof cover holding device 37, which is magnetically fixed on the reciprocating shift plate 38*b* in the bushing holder unit 31. At the same time, the bushing 4 is securely disposed in the holding recess 35*a* on the bushing holder 35.

When the rod 39*a* of the thrust cylinder 39 is extended in this state, the waterproof cover holding device 37 is pushed toward the gap detecting unit 20 (to the right in FIGS. 4–6) and the rim of the bushing 4 abuts the threshold surface 36*a* of the threshold plate 36. In this case, the waterproof cover holding device 37 is pressed by the thrust cylinder 39 via the coil spring 41, so that the rim of the bushing 4 is set into contact with the threshold face 36*a* at a constant pressure.

Subsequently, when the rod of the drive cylinder 44 in the gap (misalignment) detecting unit 32 is extended, the mobile base plate 43 is shifted towards the bushing holder unit 31. The tip portion 46*a* of the measuring probe 46 is then passed through an insertion orifice (not shown) of the threshold plate 36, enters the bushing stem 7 from the end side of the bushing 4, and contacts the rim of the connector terminal 2.

When the mobile base plate 43 is further shifted, the measuring probe 46 is pushed back toward the gap detecting device 32 (i.e., to the right in FIGS. 4–6) against the reverse biasing force of the elastic device (not shown). A measuring plate 46*c*, provided at the right side send of the measuring probe 46, then approaches the distance measuring sensor 47. The distance A between the measuring plate 46*c* at its retracted position and the distance measuring sensor 47 is measured by the distance measuring sensor 47. Thus, the distance S, between the connecting rim of the bushing portion 4 and the tip of the connector terminal 2, is determined indirectly, and it can be assessed if the distance S, or deviation from the predetermined distance S, is within tolerances.

When the product is assessed to be in conformity with the specification or tolerances, talcum power is supplied from the compressed air talc supplying unit 50, and is projected onto the internal circumferential surface of the bushing portion 4. When otherwise assessed, the compressed air talc supplying unit 50 is controlled such that the talc (talcum powder) is not supplied.

After the deviating detecting test, the respective rods of the thrust cylinder 39 and the drive cylinder 44 are retracted, so that the bushing holder unit 31 and the deviation detecting unit 32 are returned to the initial position.

When detecting a deviation for a second or subsequent type of plug connector 6, the switch 38*d* of the magnetically fixable mechanism 38 is turned off to magnetically release the waterproof cover holding device 37. The waterproof cover holding device 37 may then be removed from the reciprocating mobile plate 38*b*. Then, a waterproof cover holding device 37, having a fitting recess 37*a* corresponding to the form of the waterproof cover 5 of a second or subsequent (different) plug connector under test, is chosen. The chosen waterproof cover holding device 37 is inserted on the reciprocating mobile plate 38*b* and magnetically fixed thereon by turning on the switch 38*d*. The detecting test is then carried out as described above.

In this embodiment, in order to affix or release the waterproof cover holding device 37, it is only necessary to turn on or off the switch 38*d* of the magnetic fixing mechanism 38, so that the waterproof cover holding device 37 can be easily exchanged by a single manual operation. Further, by providing a waterproof cover holding device 37 for each type of plug connector test apparatus 30, a variety of apparatuses can be handled, thereby greatly enhancing the range of applications.

According to the invention, the connecting rim of the bushing portion 4 contained in the bushing stem 7 contacts the threshold surface 36*a* of the threshold plate 36 under a constant force, so that the connecting rim tends to be secured at a constant position. The test is then effected only when the connecting rim is secured at a constant position. As earlier described, when the bushing 4, waterproof cover 5 and pipe 3 are combined to form the length of the bushing stem 7, the total length of the bushing stem 7 can vary depending upon the fitting force employed. However, even in such a case, the apparatus according to the invention allows the reduction or elimination of the gap B between the threshold surface 36*a* of the threshold plate 36 and the rim of the bushing portion 4. Therefore, when measuring the distance S, the rim of the bushing portion 4 is secured at a predetermined position, so that the measuring error of the prior art devices is prevented. Further, the measuring precision is increased, and the error in assessing the conformity of products is efficiently reduced. Moreover, the conformity of the product to be used may be assessed using a set-up technique familiar from the prior art, i.e., by fitting the waterproof cover 5 into the fitting recess 14*a*.

Although the above description sets out a particular embodiment of the present invention, modifications of the invention will be readily apparent to those skilled in the art, and it is intended that the scope of the invention be determined solely by the appended claims.

The present disclosure relates to subject matter contained in Japanese Application No. HEI-173595, filed on Jul. 3, 1996, which is expressly incorporated herein by reference in its entirety.

What is claimed is:

1. A spark plug connector checking apparatus for checking a spark plug connector, said spark plug connector having a bushing stem having an axial direction and adapted to fit to said spark plug, said bushing stem including a terminal with a tip edge adapted to connect to a spark plug having a plug rim, a bushing with a connecting rim adapted to receive said plug rim, a connecting path connecting said bushing stem to a high-tension electrical cable, and a cap portion for fixing the connecting path, said apparatus comprising:

a spark plug connector holding unit having:

a cap holder unit including a movable cap holder in which the cap portion and bushing stem are fit and a magnetizable portion by which said cap holder unit may be magnetically fixed;

a magnetic fixing mechanism that magnetically fixes and releases said magnetizable portion of said cap holder unit;

a shift guide that provides free axial movement of said movable cap holder and thereby the cap portion and the bushing stem along the axial direction when the cap holder unit is magnetically fixed;

an axial guide that prevents lateral movement of the bushing but provides free axial movement of the bushing along the axial direction;

a bushing holder receiving the bushing, said bushing holder being spaced from said cap holder unit and including a threshold plate with a measuring threshold surface that receives the connecting rim of the bushing; and a thrust mechanism that moves said movable cap holder the bushing stem, and the bushing along the axial direction toward said bushing holder until the connecting rim of the bushing contacts said measuring threshold surface, thereby eliminating any gap between the connecting rim of the bushing and the measuring threshold surface.

2. The spark plug connector checking apparatus according to claim 1, further comprising a deviation detecting unit that detects a deviation of the distance between said the connecting rim of the bushing and the tip rim of the connection terminal, said deviation detecting unit including a tip portion for insertion into the bushing from the connecting rim side, and a detector for detecting a deviation in a predetermined gap between the measuring threshold face and the tip rim of the connection terminal.

3. The spark plug connector checking apparatus according to claim 2, wherein said tip portion of said deviation detecting unit includes a plurality of indicator powder projecting orifices, and an indicator powder supply unit connected to said indicator powder projecting orifices.

4. The spark plug connector checking apparatus according to claim 1, wherein said magnetizable portion includes a metal plate extending over the length of the cap holder unit on a side of the cap holder unit opposite the cap holder.

5. The spark plug connector checking apparatus according to claim 1, wherein the shift guide includes a pair of rails extending in the axial direction and a mobile plate reciprocable along said pair of rails.

6. The spark plug connector checking apparatus according to claim 1, wherein the thrust mechanism comprises a pressing device that presses the connecting rim of the bushing against said measuring threshold surface at a constant force.

7. The spark plug connector checking apparatus according to claim 6, wherein said thrust mechanism comprises:

a piston cylinder mounted to said cap holder unit at an end opposite said bushing;

an elastic biasing device in said piston cylinder;

a thrusting device that pushes a piston and a connecting rod, said piston entering said piston cylinder via said opening and pushing said elastic biasing device towards said cap holder unit.

* * * * *

UNITED STATES PATENT AND TRADEMARK OFFICE

CERTIFICATE OF CORRECTION

PATENT NO. : 6,176,124 B1
DATED : January 23, 2001
INVENTOR(S) : H. Tachikiri

It is certified that error appears in the above-identified patent and that said Letters Patent is hereby corrected as shown below:

Column 8,
Line 18, after "holder" insert -- , --.

Signed and Sealed this

Eighth Day of January, 2002

Attest:

JAMES E. ROGAN

*Attesting Officer*

*Director of the United States Patent and Trademark Office*